(12) United States Patent
Hou (10) Patent No.: US 7,775,720 B2
(45) Date of Patent: Aug. 17, 2010

(54) BEARING DEVICE

(75) Inventor: Chuen-Shu Hou, Taipei Hsien (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 522 days.

(21) Appl. No.: 11/781,674

(22) Filed: Jul. 23, 2007

(65) Prior Publication Data

US 2008/0247691 A1 Oct. 9, 2008

(30) Foreign Application Priority Data

Apr. 6, 2007 (CN) .................... 2007 1 0073966

(51) Int. Cl.
*F16C 33/10* (2006.01)
*F16C 33/02* (2006.01)
(52) U.S. Cl. ..................... 384/283; 384/120
(58) Field of Classification Search ................ 384/100, 384/107, 112–115, 119–120, 130, 132, 283, 384/322
See application file for complete search history.

(56) References Cited

U.S. PATENT DOCUMENTS

| | | | | | |
|---|---|---|---|---|---|
| 4,445,793 A | * | 5/1984 | Shinohara | ................... | 384/130 |
| 4,798,480 A | * | 1/1989 | Van Beek | ................... | 384/114 |
| 5,707,154 A | * | 1/1998 | Ichiyama | ................... | 384/107 |
| 5,806,987 A | * | 9/1998 | Nose et al. | ................... | 384/100 |
| 6,072,660 A | * | 6/2000 | Teshima | ................... | 384/113 |
| 6,246,136 B1 | * | 6/2001 | Ichiyama | ................... | 384/107 |
| 6,296,391 B1 | * | 10/2001 | Hayakawa et al. | ........... | 384/119 |
| 6,361,214 B1 | * | 3/2002 | Ichiyama | ................... | 384/115 |
| 6,774,516 B2 | * | 8/2004 | Kim | ................... | 310/67 R |
| 6,860,636 B2 | * | 3/2005 | Takahashi | ................... | 384/119 |
| 6,890,104 B2 | * | 5/2005 | Gomyo et al. | ............. | 384/132 |
| 6,905,247 B2 | * | 6/2005 | Kishi | ................... | 384/120 |
| 7,033,078 B2 | * | 4/2006 | Murabe et al. | ............. | 384/114 |
| 7,201,516 B2 | * | 4/2007 | Haga | ................... | 384/132 |

FOREIGN PATENT DOCUMENTS

| | | |
|---|---|---|
| CN | 2545404 Y | 4/2003 |
| CN | 1441530 A | 9/2003 |
| CN | 1619175 A | 5/2005 |
| TW | M251052 | 11/2004 |
| WO | 2005/113995 A2 | 12/2005 |

* cited by examiner

*Primary Examiner*—Marcus Charles
(74) *Attorney, Agent, or Firm*—Jeffrey T. Knapp (57) ABSTRACT

A bearing assembly comprises a bearing (200) having a central hole (250) and a shaft (280) received in the central hole. The bearing has at least one sloping inner surface (2522) facing to the shaft and around the central hole. A gap is formed between the sloping inner surface and shaft. A width of the gap is gradually reduced along an axial direction of the central hole. The central hole has two side holes (254, 255) each of which has a diameter smaller than that of a middle hole (252) of the central hole (250), wherein the sloping inner surface is located corresponding to the middle hole.

13 Claims, 8 Drawing Sheets

BEARING DEVICE

BACKGROUND OF THE INVENTION

1. Field of the Invention

The present invention relates to a bearing device, particularly to a sleeve bearing device having good lubricant retention.

2. Description of Related Art

At present, bearings are widely used in spindle motors in devices, such as compact disc (CD) drivers, digital video disc (DVD) drivers, hard disk drivers, laser beam printers, floppy disk drivers or in heat-dissipation fans. Spindle motors require bearings of small size, high rotational accuracy and long life. A related bearing defines a bearing hole therein. A shaft is rotatably received in the bearing hole. Lubricant is often used between an inner circumferential surface of the bearing and an external circumferential surface of the shaft to reduce abrasion of the bearing and the shaft. However, the lubricant is prone to leak out of the related bearing so that the bearing cannot work normally due to lack of lubricant. Thus, lubricant retention becomes a problem in the related bearing.

It is therefore desirable to provide a bearing having good lubricant retention and a long operating life.

SUMMARY OF THE INVENTION

A bearing has a central hole for receiving a shaft therein so that the shaft can rotate relative to the bearing. The bearing has at least one sloping inner surface facing to the shaft. A gap is formed between the sloping inner surface and shaft. A width of the gap is gradually reduced along an axial direction of the central hole.

Other advantages and novel features of the present invention will become more apparent from the following detailed description of preferred embodiment when taken in conjunction with the accompanying drawings.

BRIEF DESCRIPTION OF THE DRAWINGS

Many aspects of the present bearing device can be better understood with reference to the following drawings. The components in the drawings are not necessarily drawn to scale, the emphasis instead being placed upon clearly illustrating the principles of the present driving device. Moreover, in the drawings, like reference numerals designate corresponding parts throughout the several views.

DETAILED DESCRIPTION OF THE INVENTION

Figure 1:
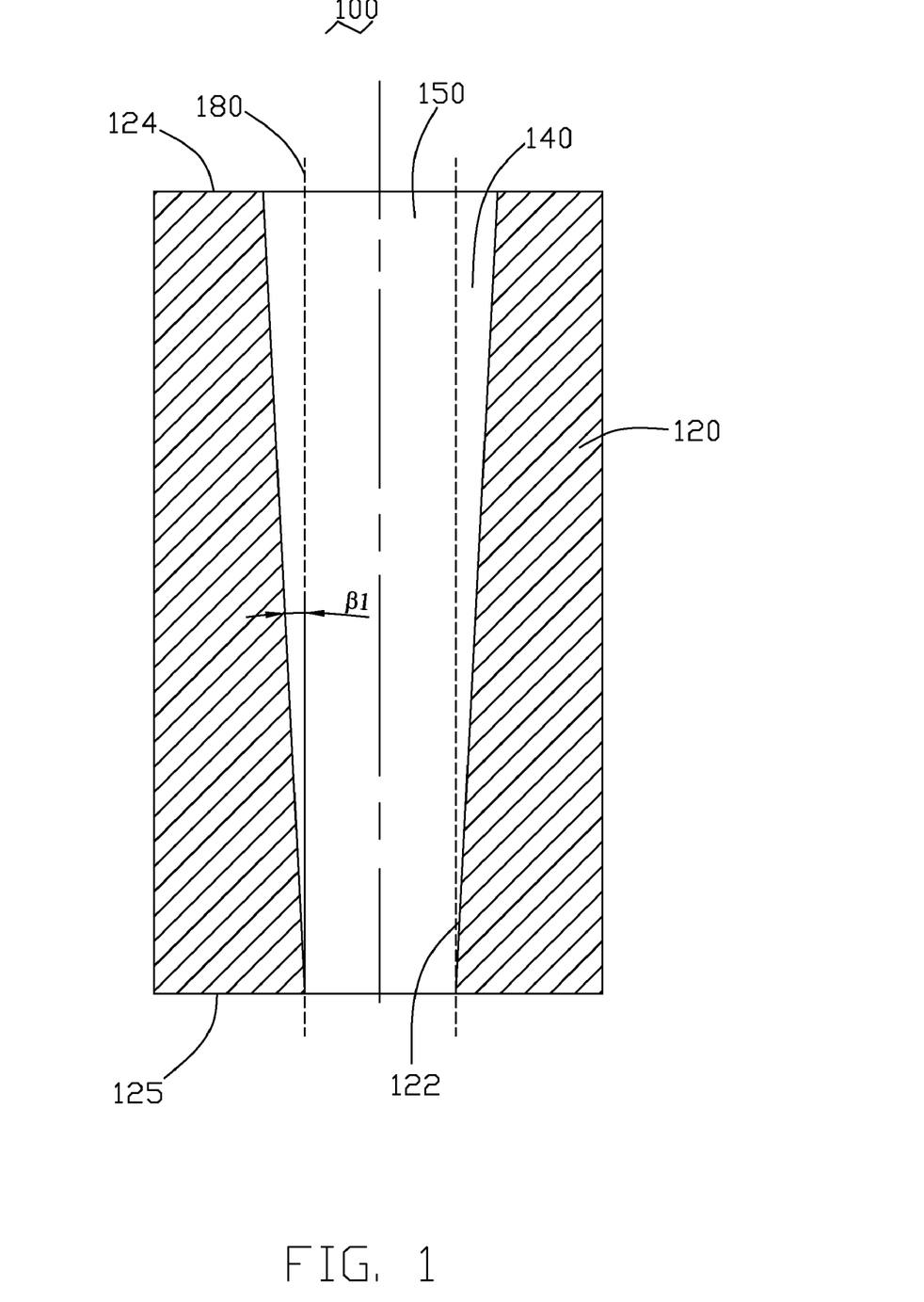
FIG. 1 is a cross-sectional view of a bearing device in accordance with a preferred embodiment of the present invention, together with a shaft shown in dotted line.

Referring to FIG. 1, a bearing 100 in accordance with a preferred embodiment of the present invention is shown. The bearing 100 comprises a cylindrical body 120 and a central hole 150 defined through the body 120 along an axis thereof. The central hole 150 is used to receive a rod-like shaft 180 (shown in dotted line) having a uniform diameter. The body 120 has a sloping inner circumferential surface 122 surrounding the central hole 150. The body 120 has an upper surface 124 and a lower surface 125. The central hole 150 becomes gradually smaller along the axial direction from the upper surface 124 to the lower surface 125. An angle $\beta 1$, as shown in FIG. 1, is formed between the inner circumferential surface 122 and a circumferential periphery of the shaft 180. The angle $\beta 1$ is in an range of 0.1° to 10°. The diameter of the shaft 180 is at most identical to the diameter of the central hole 150 located in the lower surface 125.

When the cylindrical shaft 180 is assembled into the central hole 150 of the bearing 100, a wedge-shaped gap 140 having different widths between the circumferential periphery of the shaft 180 and the inner circumferential surface 122 of the bearing 100 is formed. The width of the wedge-shaped gap 140 gradually becomes smaller along the axis direction from the upper surface 124 to the lower surface 125. The wedge-shaped gap 140 accommodates lubricant, such as oil. During rotation of the shaft 180, the lubricant is driven flowing in the wedge-shaped gap 140 by the rotating shaft 180. Accordingly, a fluid dynamic pressure is generated in the wedge-shaped gap 140 during the lubricant flows in the wedge-shaped gap 140 with different widths. The fluid dynamic pressure gradually becomes bigger along the axis direction from the upper surface 124 to the lower surface 125 as the width becomes smaller. The fluid dynamic pressure not only prevents the lubricant from flowing to the upper surface 124 and leaking out of the bearing 100, but also forms a hydrodynamic pressure near the lower surface 125 to support the shaft 180 rotating steadily. Furthermore, since the area of contacting surfaces between the shaft 180 and the bearing 100 is reduced compared to the conventional bearing which has a central hole with a uniform diameter, abrasion of the shaft 180 and the bearing 100 is reduced greatly so that the bearing 100 has a long operating life.

Figure 2:
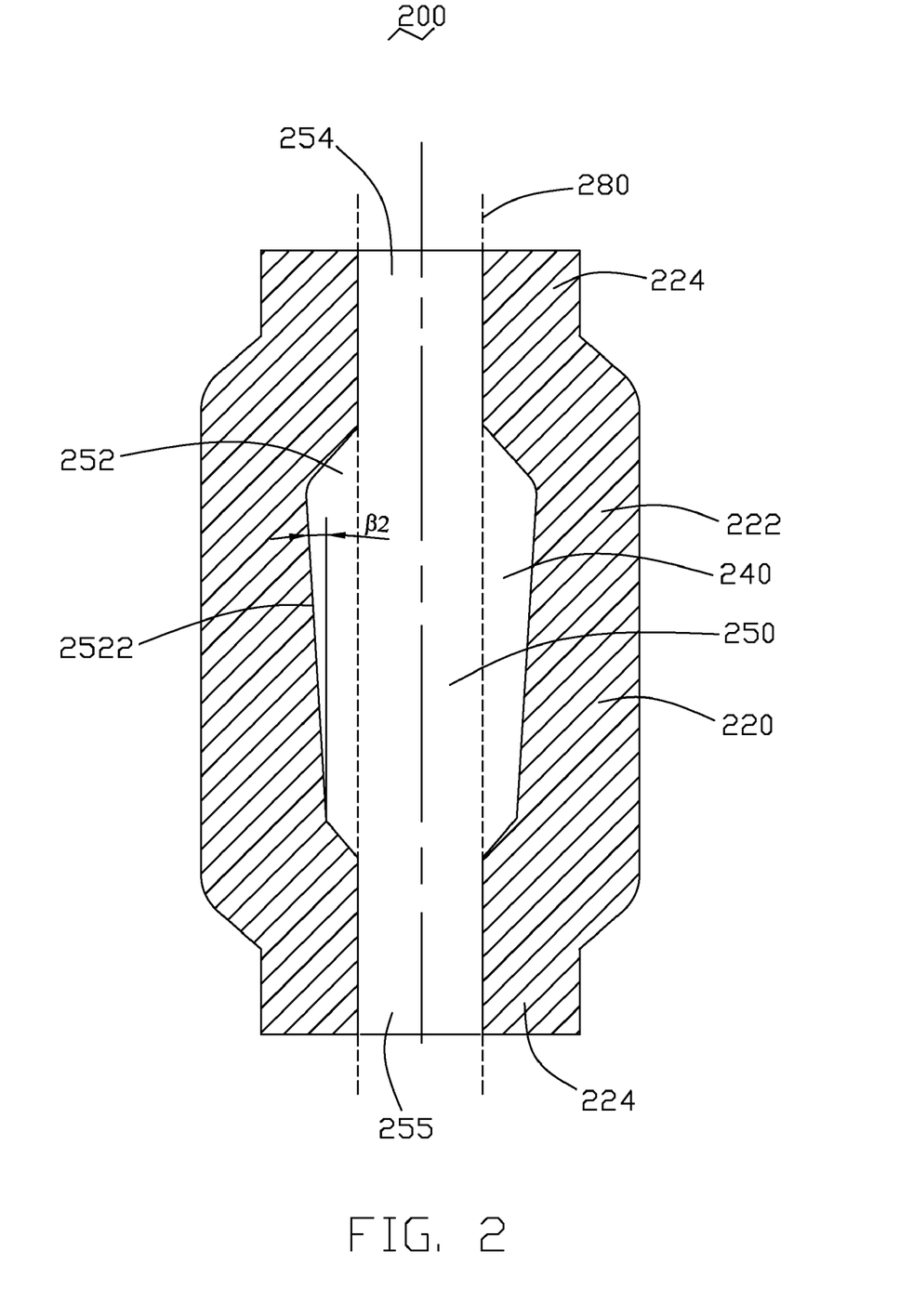
FIG. 2 is a cross-sectional view of a bearing device in accordance with a second embodiment of the present invention, together with a shaft shown in dotted line.

Referring to FIG. 2, a bearing 200 in accordance with a second embodiment of the present invention is shown. The bearing 200 comprises a columnar body 220 and a central hole 250 defined through the body 220 along an axis thereof. The body 220 comprises a cylindrical central portion 222 and two similar side portions 224. The central portion 222 locates in a middle of the body 220 and the two side portions 224 are adjacent to two ends of the body 220 respectively. An axial length of the central portion 222 is longer than that of the two side portions 224. An external diameter of each of the side portions 224 is smaller than that of the central portion 222. Outer peripheries of the bearing 200 between the central portion 222 and the side portions 224 are sloping, tapering toward the side portions 224, respectively. The central hole 250 comprises a middle hole 252 and two side holes 254, 255 adjacent to the middle hole 252 along the axial direction of the bearing 200. The side holes 254, 255 are adjacent to two ends of the body 220 respectively. The middle hole 252 locates in a middle of the body 220 and is longer than the side holes 254, 255 along the axial direction. The middle hole 252 has an inner circumferential surface 2522 which is oblique relative to the axial direction of the central hole 150; thus the middle hole 252 of the central hole 250 becomes gradually smaller from an upper end to a lower end along the axial direction of the body 220. An angle β2 is formed between the inner circumferential surface 2522 and the axial direction of the body 120. The angle β2 is in an range of approximate 0.1° to 10°. The two side holes 254, 255 are identical to each other and are smaller than the middle hole 252. Inner circumferential peripheries between the middle hole 252 and the side holes 254, 255 are sloping, tapering toward the side portions 224, respectively. When a shaft 280 is used to engage in the central hole 250, the side holes 254, 255 are used to intimately receive an outer periphery of the shaft 280. A wedge-shaped gap 240 is formed between the inner circumferential surface 2522 and the outer periphery of the shaft 280.

Figure 3:
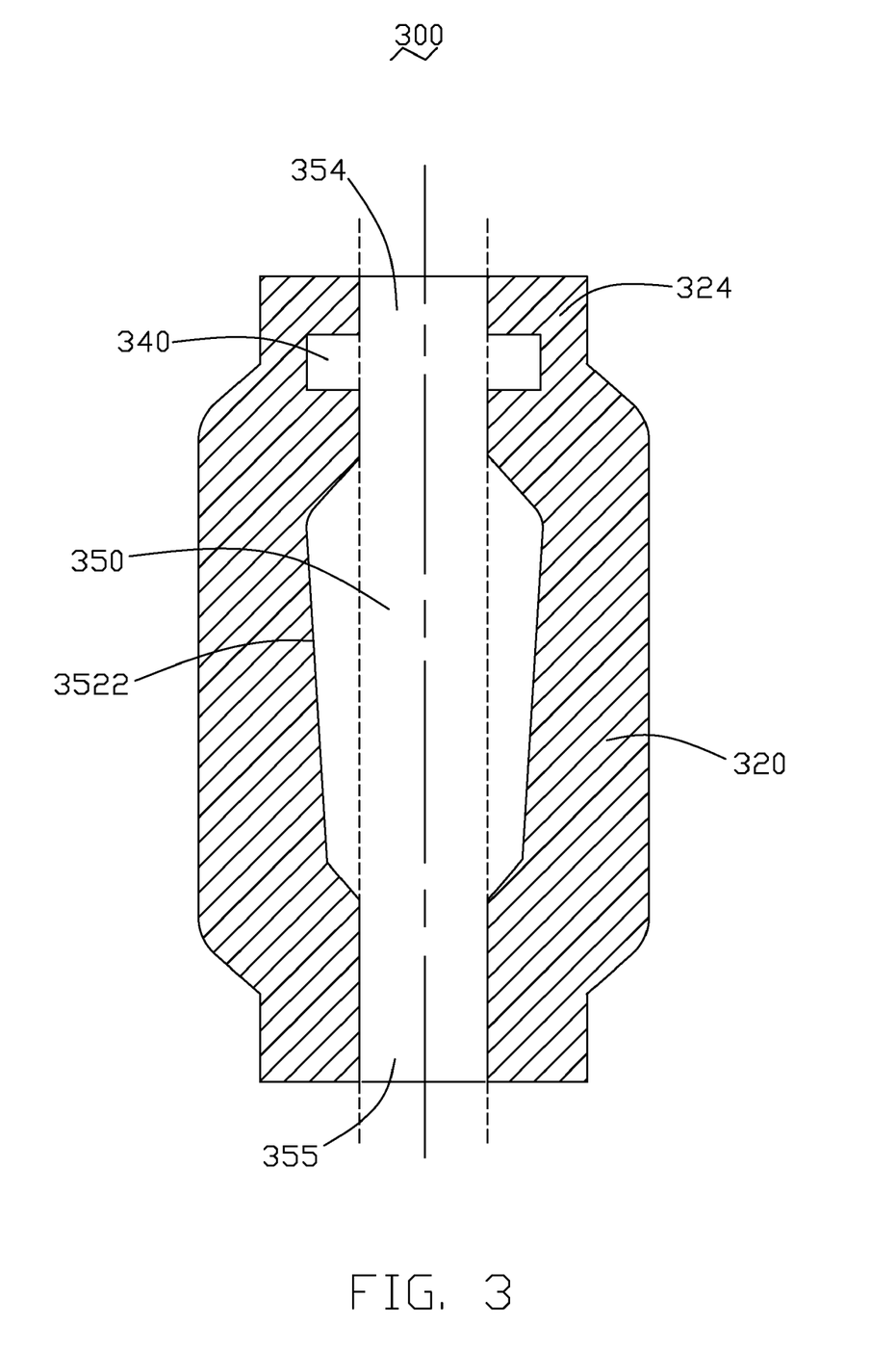
FIG. 3 is a cross-sectional view of a bearing device in accordance with a third embodiment of the present invention, together with a shaft shown in dotted line.

Referring to FIG. 3, a bearing 300 in accordance with a third embodiment of the present invention is shown. The bearing 300 has a similar configuration to the bearing 200 of the second embodiment, such as a body 320, a central hole 350, a sloping inner surface 3522, two side holes 354, 355 and two side portions 324, which have configurations the same as those of corresponding parts of the bearing 200. Thus, detailed descriptions thereof are omitted here. A difference between the bearing 300 and the bearing 200 is that a holding groove 340 is defined in an upper end of the bearing 300. The holding groove 340 is annular and defined in an inner surface of the body 320. The holding groove 340 locates in a middle of the side hole 354 and is separated from a top outside of the bearing 300 and a middle hole (not labeled) of the central hole 350. When a shaft (not labeled, shown in dotted line), engaging in the central hole 350 of the bearing 300 rotates, the holding groove 340 can be used to receive the lubricant flowing up from the middle hole of the central hole 350 and to prevent the lubricant from leaking out of the bearing 300 upwardly.

Figure 4:
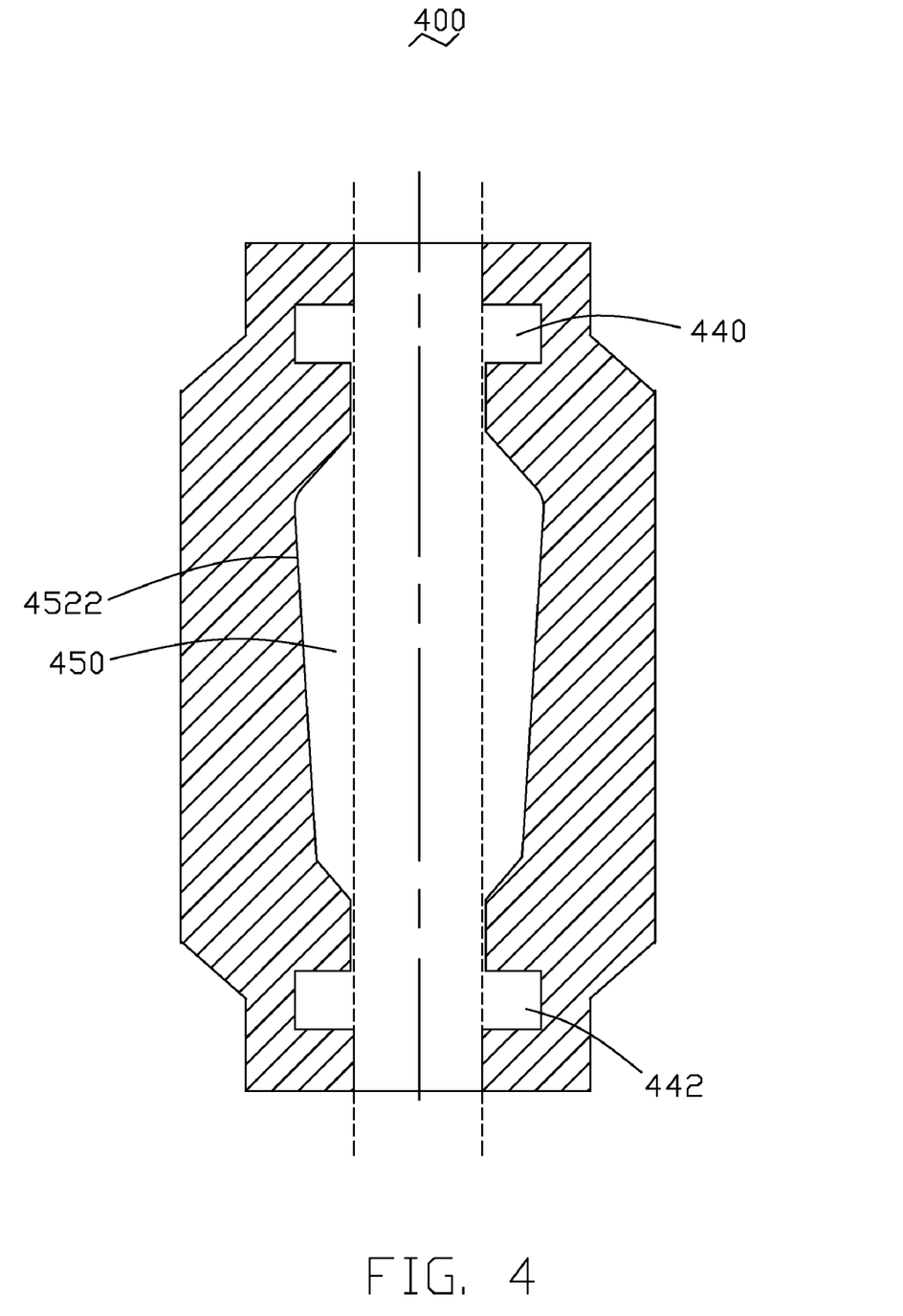
FIG. 4 is a cross-sectional view of a bearing device in accordance with a fourth embodiment of the present invention, together with a shaft shown in dotted line.

Referring to FIG. 4, a bearing 400 in accordance with a fourth embodiment of the present invention is shown. The bearing 400 has a similar configuration to the bearing 300 of the third embodiment, such as a central hole 450, a sloping inner surface 4522, and a holding groove 440, which have configurations the same as those of corresponding parts of the bearing 300. A difference between the bearing 400 and the bearing 300 is that another holding groove 442 is defined in a lower end of the bearing 400. The holding groove 442 is annular and symmetrical to the holding groove 440. When a shaft (not labeled, shown in dotted line) engaging in the central hole 450 of the bearing 400 rotates, the two holding groove 440, 442 are used to receive lubricant from a middle hole (not labeled) of the central hole 450 simultaneously, thereby to further prevent the lubricant from leaking out of the bearing 400 upwardly and downwardly. Thus, the bearing 400 has a better lubricant retention capability than the bearing 300.

Figure 5:
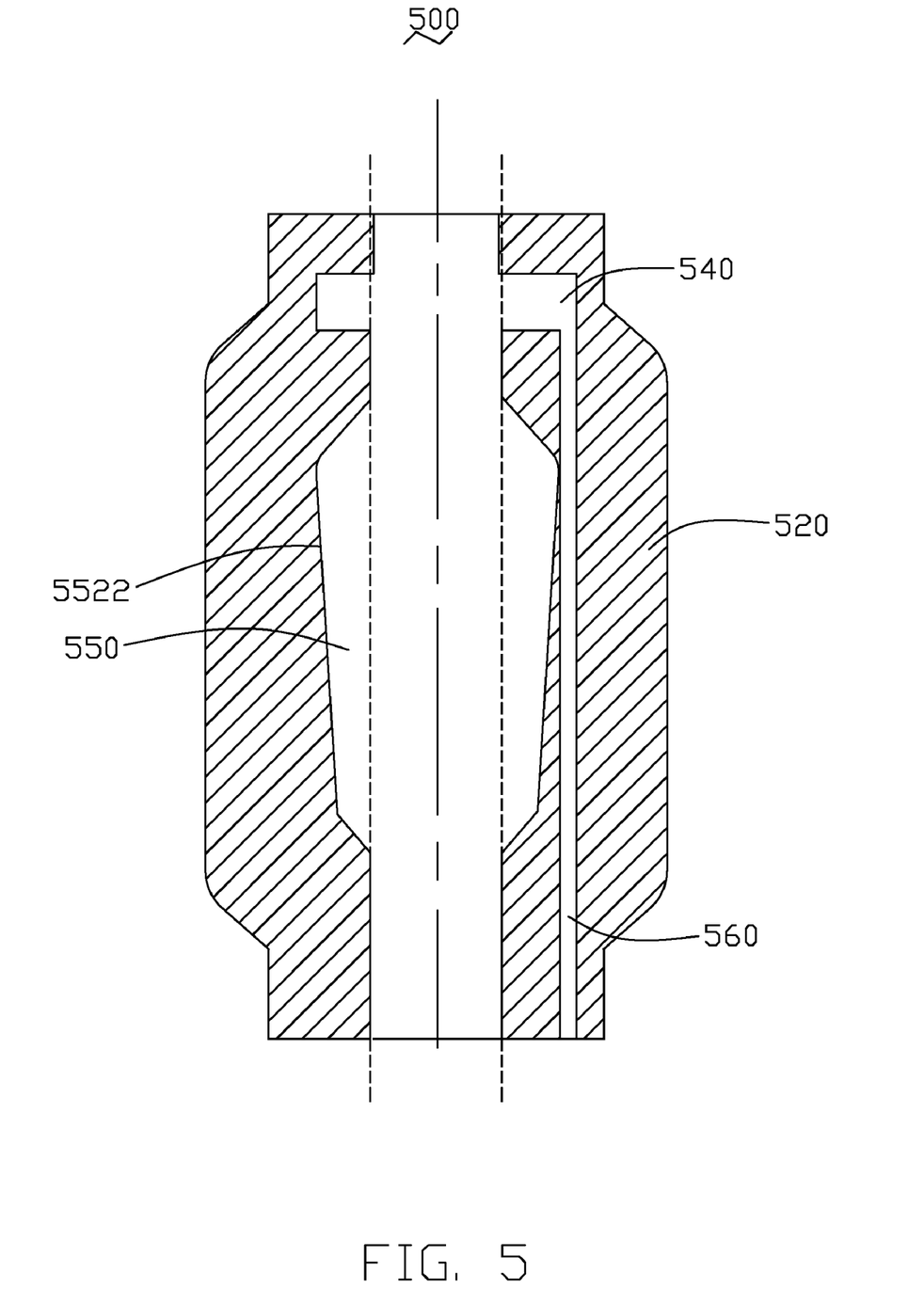
FIG. 5 is a cross-sectional view of a bearing device in accordance with a fifth embodiment of the present invention, together with a shaft shown in dotted line.

Referring to FIG. 5, a bearing 500 in accordance with a fifth embodiment of the present invention is shown. The bearing 500 has a similar configuration to the bearing 300 of the third embodiment, such as a body 520, a central hole 550, a sloping inner surface 5522 and a holding groove 540. A difference between the bearing 500 and the bearing 300 is that a conduction channel 560 is defined in the bearing 500 near the central hole 550. The conduction channel 560 extends in the body 520 from a lower side of the bearing 500 to the holding groove 540 along an axial direction of the bearing 500. The conduction channel 560 communicates the holding groove 540 with a bottom end of the bearing 500 so that lubricant in the holding groove 540 can flow downwardly into a lubricant retaining pool (not shown) below the bottom end of the bearing 500 via the conduction channel 560. Then the lubricant in the lubricant retaining pool can be driven upwardly back into the central hole 550 by a pumping force of the rotating shaft (not labeled). Thus, the lubricant can be conserved better and used more efficiently. Furthermore, the conduction channel 560 can be designed to extend from the lower side to a top side of the bearing 500 in a different application.

Figure 6:
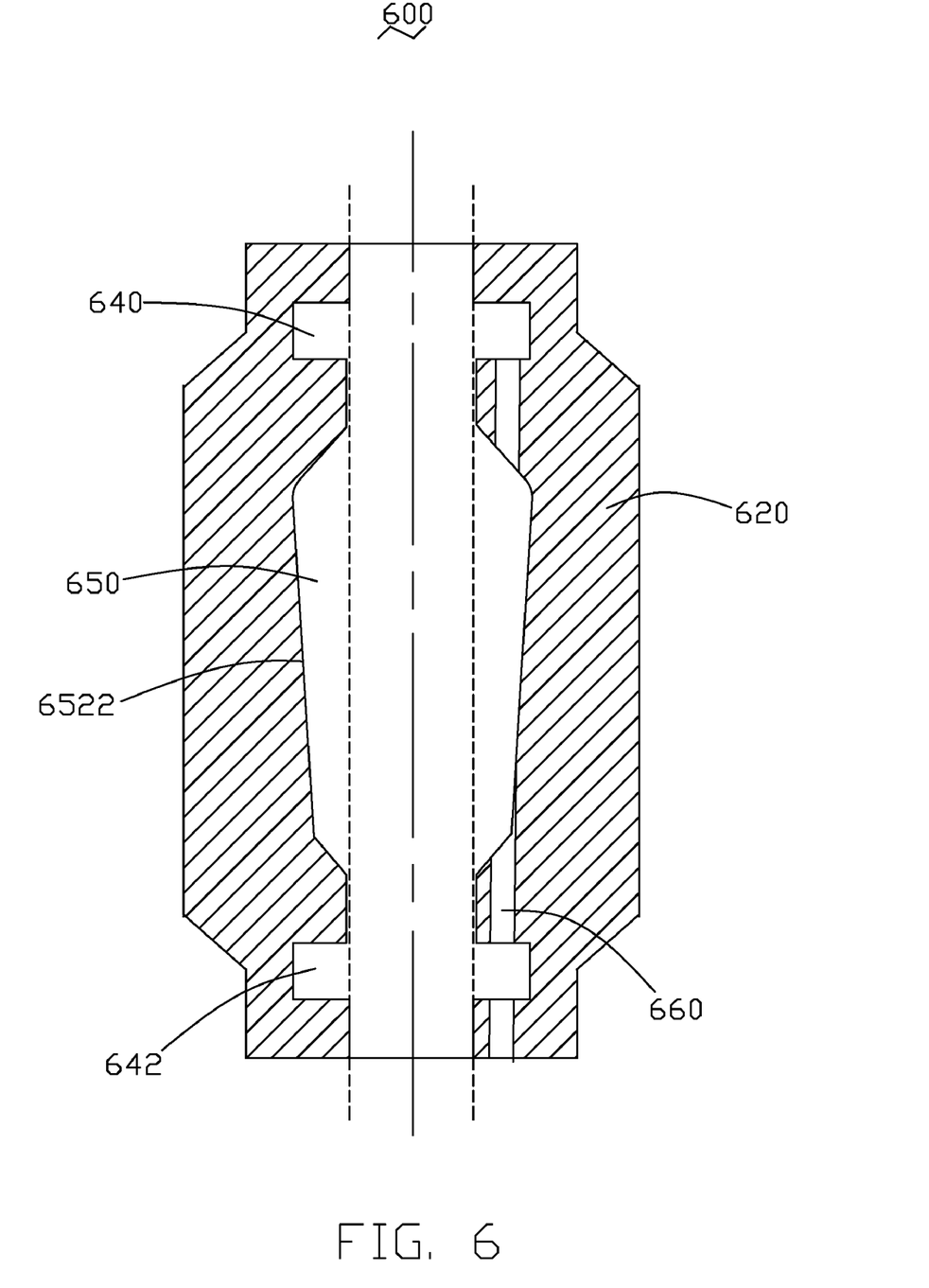
FIG. 6 is a cross-sectional view of a bearing device in accordance with a sixth embodiment of the present invention, together with a shaft shown in dotted line.

Referring to FIG. 6, a bearing 600 in accordance with a sixth embodiment of the present invention is shown. The bearing 600 has a similar configuration to the bearing 400 of the fourth embodiment, such as a body 620, a central hole 650, a sloping inner surface 6522, and two holding grooves 640, 642. A difference between the bearing 600 and the bearing 400 is that a conduction channel 660 is defined in the body 620 and extends from a lower side of the bearing 600 to the holding grooves 640, 642 along an axial direction of the bearing 600. The conduction channel 660 communicates the holding grooves 640, 642 with a bottom end of the bearing 600 which is located in a lubricant retaining pool so that lubricant can be conserved better and used more efficiently. Furthermore, the conduction channel 660 can be designed to extend from the lower side to a top side of the bearing 600 in a different application.

As mentioned above, the inner surfaces of the bearings 100, 200, 300, 400, 500, 600 are sloping surfaces, while the shafts 180, 280 each have a uniform diameter. However, in another embodiment, the cylindrical bearings may be designed to have a bearing hole with a uniform inner diameter; meanwhile, an outer periphery of the shaft may be shaped into a sloping surface, which may be a mirror image to one of the inner surfaces of the bearings 100, 200, 300, 400, 500, 600. Accordingly, a wedge-shaped gap is still formed between the bearing and the shaft. Thus, the bearing and shaft can also have good lubricant retention and a long useful life.

Figure 7:
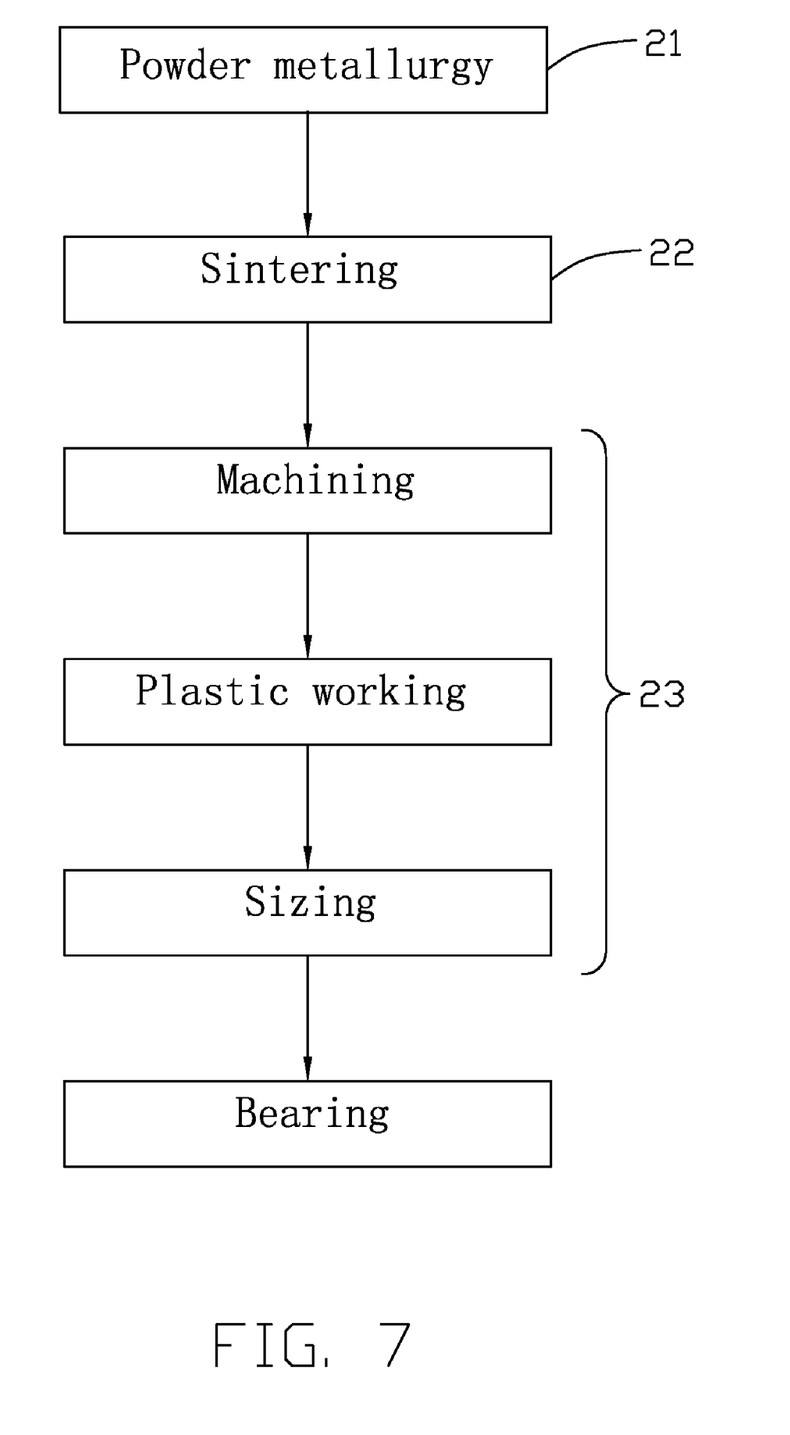
FIG. 7 is a flow chart of a method employed in manufacturing the bearing device of the present invention.

As shown in FIG. 7, a method for manufacturing the bearing 200 in accordance with the present invention, comprises steps of:

step 21: using powder metallurgy to manufacture a desired bearing preform (not shown) with a sloping inner surface;

step 22: sintering the bearing preform; and step 23: performing machining, plastic working and sizing to the bearing preform, thereby forming the bearing 200.

Furthermore, the method for manufacturing the bearing 200 can be used for manufacturing the bearings 100, 300, 400, 500, 600 or the shaft having sloping surface in the another embodiment as described above. In step 21, a core for forming the sloping inner surface of the desired bearing preform should be designed to have a sloping periphery with a sloping angle. A range of the sloping angle is in an approximate range of 0.1° to 10° in accordance with the angle β2 of the bearing 200. Furthermore, the bearing preform should be able to be separated from a mould easily. In manufacturing the bearings 500, 600 with the conduction channels 560, 660 using the above-disclosed method, a mandrel can be mounted in the mould to form the conduction channels 560, 660.

Figure 8:
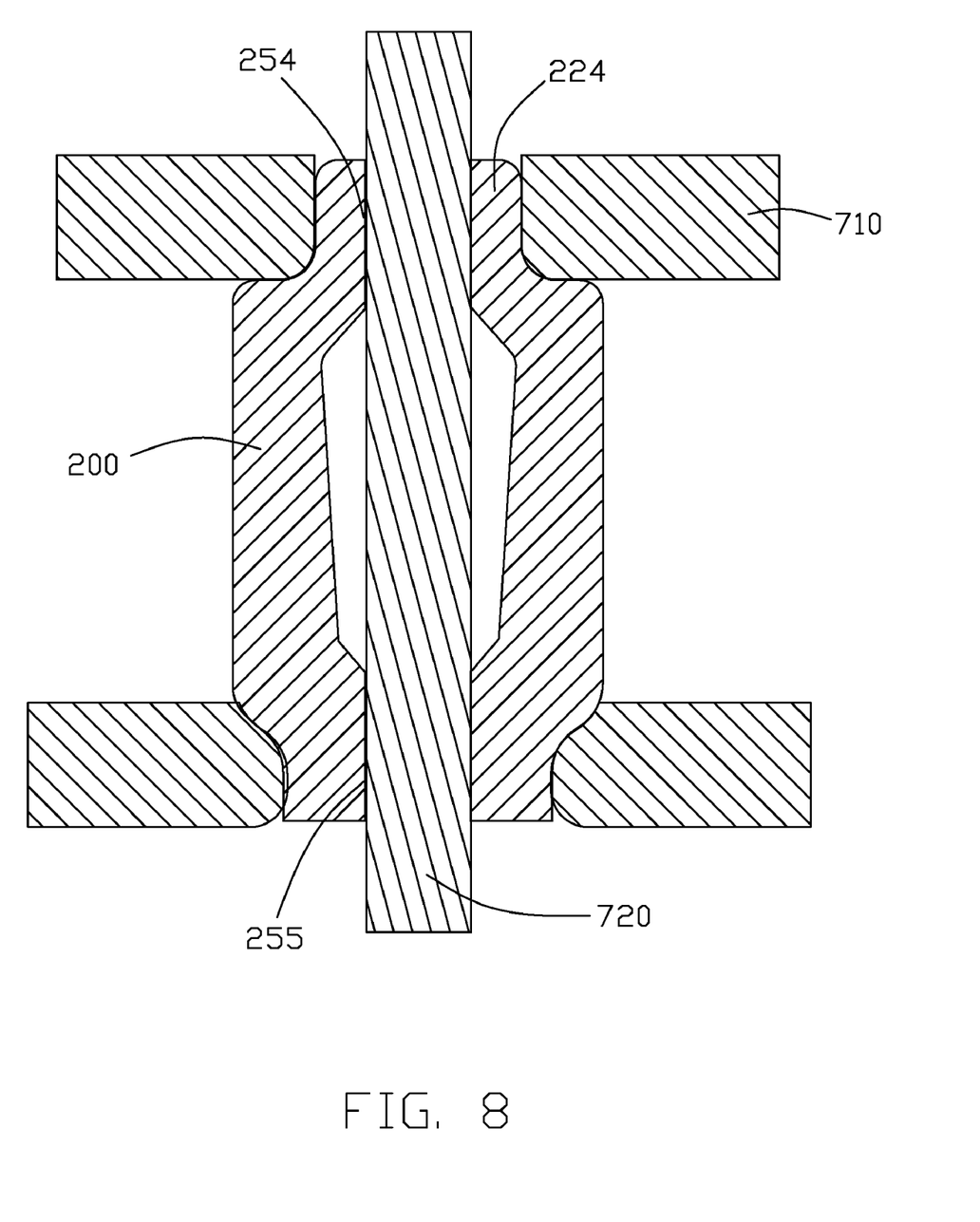
FIG. 8 is a process for performing a precision machining to a bearing preform in FIG. 7.

In step 23, in manufacturing the bearings 300, 400, 500, 600 with the holding grooves 340, 440, 442, 540, 640, 642 using the method, a machining method such as boring with computerized numerical control (CNC) can be used to make the holding grooves 340, 440, 442, 540, 640, 642. In manufacturing the bearings 200, 300, 400, 500, 600 with a big middle hole and two small side holes, a plastic working method such as punching can be used for firstly shaping the central holes 250, 350, 450, 550, 650 each with a diameter of that of the two small side holes. Then a boring is used to form the big middle hole of the central hole. In order to give the bearing a high level of precision, it is necessary to machine the bearing preform by using a sizing method to parts of the bearings 100, 200, 300, 400, 500, 600 which are used to engage with corresponding parts of the shafts. For example, the bearing 200 in FIG. 8 is fixed via the side portions 224 fastened by a clamp 710. A grinding rod 720 is used to precisely machine the side holes 254, 255 so that they can have accurate dimension and configuration.

It is to be understood that the above-described methods are intended to illustrate rather than limit the invention. Variations may be made to the methods without departing from the spirit of the invention. Accordingly, it is appropriate that the appended claims be construed broadly and in a manner consistent with the scope of the invention.

What is claimed is:

1. A bearing assembly, comprising:
a bearing member comprising an inner surface defining an axial central hole therein, the inner surface of the bearing member comprising a top portion at a top end of the bearing member, a bottom portion at a bottom end of the bearing member, and a middle portion larger than both the top portion and the bottom portion in diameter, a first chamfer angle being formed between the top portion and a top end of the middle portion, and a second chamfer angle being formed between the bottom portion and a bottom end of the middle portion, the diameter of the middle portion decreasing downwardly from the first chamfer angle to the second chamfer angle; and
a rotatable member received in the central hole and rotatably supported by the top portion and the bottom portion of the inner surface of the bearing member, a wedge-shaped gap being formed between the rotatable member and the middle portion of the inner surface of the bearing member, whereby lubricant can be more easily retained between the rotatable member and the bearing member.

2. The bearing assembly as claimed in claim 1, wherein the rotatable member is a shaft.

3. The bearing assembly as claimed in claim 2, wherein the middle portion of the inner surface of the bearing member is a sloping surface, and an angle is formed between the sloping surface of the bearing member and an axis of the bearing member, the angle being in the range from 0.1 degrees to 10 degrees.

4. The bearing assembly as claimed in claim 1, wherein one annular holding groove is defined in the top end of the bearing member, the one annular holding groove being larger than the bearing hole in diameter and communicating with the bearing hole.

5. The bearing assembly as claimed in claim 4, wherein another annular holding groove is defined in the bottom end of the bearing member, the another annular holding groove being larger than the bearing hole in diameter and communicating with the bearing hole.

6. The bearing assembly as claimed in claim 4, wherein at least one conduction channel is defined in the bearing member and extends from the one annular holding groove through the bottom end of the bearing member, the bearing hole extending through the bottom end of the bearing member, the at least one conduction channel being spaced from and parallel to the central hole of the bearing member.

7. The bearing assembly as claimed in claim 1, wherein the bearing member comprises a cylindrical central portion and two similar side portions, the central portion locates in a middle of the bearing member and the two side portions are at positions corresponding to the top and bottom ends of the bearing member respectively, and an external diameter of each of the side portions is smaller than that of the central portion.

8. A bearing assembly comprising a bearing having a central hole and a shaft received in the central hole, the bearing having at least one sloping inner surface surrounding the central hole and facing the shaft, a gap being formed between the sloping inner surface and the shaft, a width of the gap being gradually reduced along an axial direction of the central hole, wherein an annular holding groove and a conduction channel are defined in the bearing, the annular holding groove being formed around the central hole and above the sloping inner surface, the conduction channel communicating with the annular holding groove directly, but being spaced from the central hole.

9. The bearing assembly as claimed in claim 8, wherein an angle is formed between the sloping inner surface of the bearing and the axial direction, and the angle is in an approximate range of from 0.1° to 10°.

10. The bearing assembly as claimed in claim 8, wherein the central hole of the bearing comprises a middle hole and two side holes adjacent to two ends of the bearing respectively, the sloping inner surface is formed around the middle hole, and the two side holes are smaller than the middle hole.

11. The bearing assembly as claimed in claim 10, wherein the bearing comprises a cylindrical central portion and two similar side portions, the central portion locates in a middle of the bearing and the two side portions are adjacent to the two ends of the bearing and at positions corresponding to the side holes, respectively, and an external diameter of each of the side portions is smaller than that of the central portion.

12. The bearing assembly as claimed in claim 8, wherein another annular holding groove is defined in the bearing below the sloping inner surface and communicating with the conduction channel directly.

13. The bearing assembly as claimed in claim 8, wherein the conduction channel and the central hole both extend through a bottom of the bearing.

* * * * *